(12) United States Patent
Hara (10) Patent No.: US 9,673,735 B2
(45) Date of Patent: Jun. 6, 2017

(54) POWER CONVERTER (71) Applicant: Panasonic Intellectual Property Management Co., Ltd., Osaka (JP)

(72) Inventor: Shoichi Hara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/065,930

(22) Filed: Mar. 10, 2016

(65) Prior Publication Data
US 2016/0315557 A1 Oct. 27, 2016

(30) Foreign Application Priority Data

Apr. 23, 2015 (JP) ................................ 2015-088009

(51) Int. Cl.
*H02M 7/5387* (2007.01)
*H02M 7/5395* (2006.01)
*H02M 1/12* (2006.01)

(52) U.S. Cl.
CPC ........ *H02M 7/5387* (2013.01); *H02M 7/5395* (2013.01); *H02M 2001/123* (2013.01)

(58) Field of Classification Search
CPC ......... H02M 7/5387; H02M 2001/123; H02M 7/5395
USPC ....................................................... 363/131
See application file for complete search history.

(56) References Cited

U.S. PATENT DOCUMENTS

| | | | | |
|---|---|---|---|---|
| 4,864,479 A | * | 9/1989 | Steigerwald | H02M 3/337 363/132 |
| 5,132,889 A | * | 7/1992 | Hitchcock | H02M 3/337 363/132 |
| 5,157,593 A | * | 10/1992 | Jain | H02M 3/337 363/132 |
| 5,208,738 A | * | 5/1993 | Jain | H02M 3/337 363/17 |
| 5,963,436 A | * | 10/1999 | Yoshida | H02M 3/3376 363/132 |
| 6,370,050 B1 | * | 4/2002 | Peng | H02M 3/33576 363/17 |
| 6,567,285 B2 | * | 5/2003 | Cho | H02M 3/3376 363/132 |

(Continued)

FOREIGN PATENT DOCUMENTS

JP 2014-209841 11/2014

*Primary Examiner* — Gustavo Rosario Benitez
*Assistant Examiner* — Htet Z Kyaw
(74) *Attorney, Agent, or Firm* — McDermott Will & Emery LLP (57) ABSTRACT

A power converter includes first through sixth switching elements, first through tenth diodes, first through fourth capacitors, and a controller. The first through fourth capacitors are connected in parallel with the first through fourth switching elements, respectively. The seventh diode is connected in series with the first capacitor and is connected inversely in parallel with the first switching element. The eighth diode is connected in series with the second capacitor and is connected in parallel with the second switching element. The ninth diode is connected in series with the third capacitor and is connected inversely in parallel with the third switching element. The tenth diode is connected in series with the fourth capacitor and is connected in parallel with the fourth switching element.

4 Claims, 5 Drawing Sheets

(56) References Cited

U.S. PATENT DOCUMENTS

| | | | | |
|---|---|---|---|---|
| 6,898,089 B2* | 5/2005 | Oates | H02M 5/225 | 363/132 |
| 7,400,061 B2* | 7/2008 | Steigerwald | H02M 3/33561 | 307/17 |
| 7,791,904 B2* | 9/2010 | Zhang | H02M 1/34 | 363/132 |
| 7,848,118 B2* | 12/2010 | Shimada | H02M 3/33584 | 363/17 |
| 8,786,204 B2* | 7/2014 | Park | H05B 33/0896 | 315/185 R |
| 9,083,230 B2* | 7/2015 | Narimani | H02M 3/07 | |
| 9,083,249 B2* | 7/2015 | Yan | H02M 3/33507 | |
| 9,112,424 B2* | 8/2015 | Kim | H02M 3/3353 | |
| 9,350,255 B2* | 5/2016 | Gekinozu | H02M 3/337 | |
| 9,455,641 B2* | 9/2016 | Kondo | H02M 3/33584 | |
| 9,461,547 B2* | 10/2016 | Liu | H02M 3/33507 | |
| 9,479,055 B2* | 10/2016 | Okamatsu | H02M 3/1582 | |
| 9,479,079 B2* | 10/2016 | Kidera | H02M 7/487 | |
| 9,570,993 B2* | 2/2017 | Takahara | H02M 3/3376 | |
| 2001/0009516 A1* | 7/2001 | Kato | H02M 1/34 | 363/17 |
| 2002/0001210 A1* | 1/2002 | Kuranuki | H02M 3/3376 | 363/98 |
| 2008/0019156 A1* | 1/2008 | Lanni | H02M 1/143 | 363/40 |
| 2009/0059622 A1* | 3/2009 | Shimada | H02M 3/33584 | 363/17 |
| 2010/0002471 A1* | 1/2010 | Heo | H02M 3/33592 | 363/17 |
| 2012/0249059 A1* | 10/2012 | Matsumae | H02M 3/337 | 320/107 |
| 2012/0293072 A1* | 11/2012 | Chang | H05B 33/0809 | 315/121 |
| 2012/0307529 A1* | 12/2012 | Chiba | H02M 1/08 | 363/17 |
| 2013/0100707 A1* | 4/2013 | Hatakeyama | H02M 3/3376 | 363/17 |
| 2014/0307489 A1* | 10/2014 | Kidera | H02M 7/487 | 363/40 |
| 2014/0362606 A1* | 12/2014 | Gekinozu | H02M 3/3376 | 363/17 |
| 2015/0055374 A1* | 2/2015 | Yamashita | H02M 3/337 | 363/17 |
| 2015/0098250 A1* | 4/2015 | Wu | H02M 3/33507 | 363/17 |
| 2015/0207424 A1* | 7/2015 | Okamoto | H02M 3/33569 | 363/17 |
| 2015/0263646 A1* | 9/2015 | Hara | B60L 11/1833 | 363/17 |
| 2016/0099649 A1* | 4/2016 | Hara | H02M 3/3353 | 363/17 |
| 2016/0190952 A1* | 6/2016 | Lee | H02M 1/4225 | 363/61 |
| 2017/0047863 A1* | 2/2017 | Kidera | H02M 1/12 | |

* cited by examiner

POWER CONVERTER

BACKGROUND

1. Technical Field

The present disclosure relates to a power converter for converting power.

2. Description of the Related Art

Japanese Unexamined Patent Application Publication No. 2014-209841 discloses an inverter device including an inverter and a clamper.

SUMMARY

In the related art, it is desirable to reduce common-mode noise.

In one general aspect, the techniques disclosed here feature a power converter including first through sixth switching elements, first through tenth diodes, first through fourth capacitors, and a controller. A second end of the first switching element and a first end of the second switching element are connected to each other at a first node. A second end of the third switching element and a first end of the fourth switching element are connected to each other at a second node. A first end of the first switching element and a first end of the third switching element are connected to each other at a third node. A second end of the second switching element and a second end of the fourth switching element are connected to each other at a fourth node. A second end of the fifth switching element and the first node are connected to each other at a fifth node. A second end of the sixth switching element and the second node are connected to each other at a sixth node. A first end of the fifth switching element and a first end of the sixth switching element are connected to each other. An input voltage is input between the third node and the fourth node. The controller controls ON/OFF states of the first through sixth switching elements to convert the input voltage into an output voltage. The output voltage is output from between the fifth node and the sixth node. The first through fourth diodes are connected inversely in parallel with the first through fourth switching elements, respectively. The fifth diode is connected in parallel with the fifth switching element. The sixth diode is connected in parallel with the sixth switching element. The first through fourth capacitors are connected in parallel with the first through fourth switching elements, respectively. The seventh diode is connected in series with the first capacitor and is connected inversely in parallel with the first switching element. The eighth diode is connected in series with the second capacitor and is connected in parallel with the second switching element. The ninth diode is connected in series with the third capacitor and is connected inversely in parallel with the third switching element. The tenth diode is connected in series with the fourth capacitor and is connected in parallel with the fourth switching element.

According to an embodiment of the present disclosure, it is possible to reduce common-mode noise.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An embodiment of the present disclosure will be described below with reference to the accompanying drawings.

The viewpoints of the present inventor will first be discussed below.

The operation of an output-clamp inverter device is different from that of the other types of inverter devices. Accordingly, in the output-clamp inverter device, common-mode noise is more likely to occur.

In particular, due to a variation in the timing at which switching elements are turned OFF, common-mode components are generated in the output U phase and W phase of the inverter of the inverter device. This causes the occurrence of radio-frequency electromagnetic noise.

Noise may be reduced by, for example, connecting a capacitor in parallel with a switching element and by decreasing the switching speed of the switching element.

That is, if the switching speed is decreased by the provision of a capacitor, radio-frequency components contained in a pulsating voltage are decreased. It is thus possible to reduce noise which conducts to the outside of the inverter device.

On the other hand, however, if the switching speed is decreased, switching loss is increased, which impairs the efficiency. Additionally, a longer dead time is required, which also impairs the controllability of the inverter device.

In view of the above-described viewpoints, the present inventor has conceived the configuration of an embodiment of the present disclosure.

Embodiment

Figure 1:
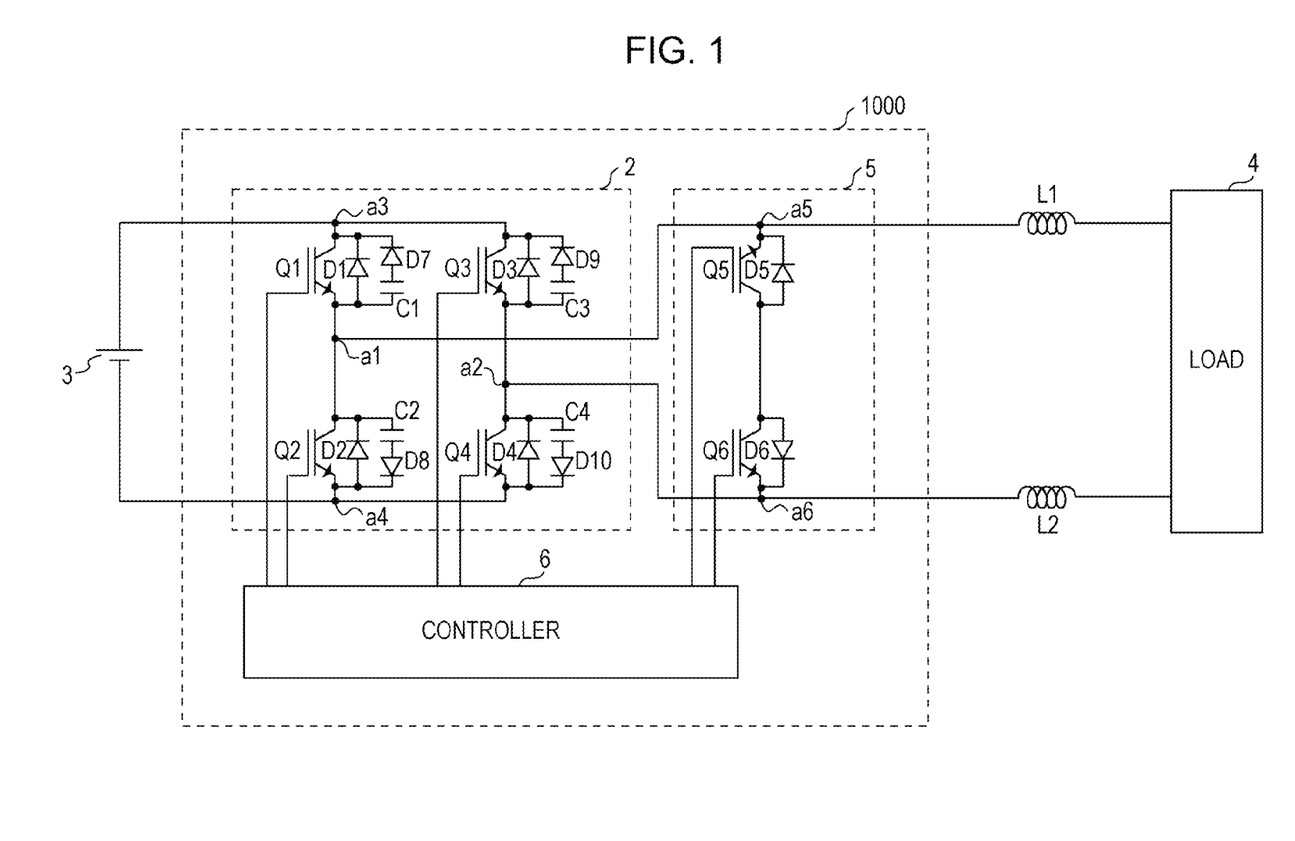
FIG. 1 is a circuit diagram of the schematic configuration of a power converter according to an embodiment.

FIG. 1 is a circuit diagram of the schematic configuration of a power converter 1000 according to an embodiment.

The power converter 1000 of this embodiment has a function of converting a direct current (DC) voltage into an alternating current (AC) voltage, for example.

The power converter 1000 includes an inverter 2 and a clamper 5.

More specifically, the power converter 1000 includes first through sixth switching elements Q1 through Q6, first through tenth diodes D1 through D10, first through fourth capacitors C1 through C4, and a controller 6.

A second end (for example, an emitter terminal) of the first switching element Q1 and a first end (for example, a collector terminal) of the second switching element Q2 are connected to each other at a first node a1.

A second end (for example, an emitter terminal) of the third switching element Q3 and a first end (for example, a collector terminal) of the fourth switching element Q4 are connected to each other at a second node a2.

A first end (for example, a collector terminal) of the first switching element Q1 and a first end (for example, a collector terminal) of the third switching element Q3 are connected to each other at a third node a3.

A second end (for example, an emitter terminal) of the second switching element Q2 and a second end (for example, an emitter terminal) of the fourth switching element Q4 are connected to each other at a fourth node a4.

A second end (for example, an emitter terminal) of the fifth switching element Q5 and the first node a1 are connected to each other at a fifth node a5.

A second end (for example, an emitter terminal) of the sixth switching element Q6 and the second node a2 are connected to each other at a sixth node a6.

A first end (for example, a collector terminal) of the fifth switching element Q5 and a first end (for example, a collector terminal) of the sixth switching element Q6 are connected to each other.

An input voltage is input between the third and fourth nodes a3 and a4.

The controller 6 controls the ON/OFF states of the first through sixth switching elements Q1 through Q6 to convert the input voltage into an output voltage. The input voltage is converted into an output voltage by a control of the ON/OFF states of the first through sixth switching elements Q1 through Q6.

The output voltage is output from between the fifth and sixth nodes a5 and a6.

The first through fourth diodes D1 through D4 are connected inversely in parallel with the first through fourth switching elements Q1 through Q4, respectively.

The fifth diode D5 is connected in parallel with the fifth switching element Q5.

The sixth diode D6 is connected in parallel with the sixth switching element Q6.

The first through fourth capacitors C1 through C4 are connected in parallel with the first through fourth switching elements Q1 through Q4, respectively.

The seventh diode D7 is connected in series with the first capacitor C1 and is connected inversely in parallel with the first switching element Q1.

The eighth diode D8 is connected in series with the second capacitor C2 and is connected inversely in parallel with the second switching element Q2.

The ninth diode D9 is connected in series with the third capacitor C3 and is connected inversely in parallel with the third switching element Q3.

The tenth diode D10 is connected in series with the fourth capacitor C4 and is connected inversely in parallel with the fourth switching element Q4.

With the above-described configuration, it is possible to reduce common-mode noise while an increase in the switching loss is being suppressed.

The term "being connected inversely in parallel with" means that predetermined two elements are connected in parallel with each other, but their conducting directions are opposite.

The above-described input voltage is, for example, a DC voltage. The input voltage may be supplied from a DC voltage source 3.

The above-described output voltage is, for example, an AC voltage. The output voltage may be supplied to a load 4.

Figure 2:
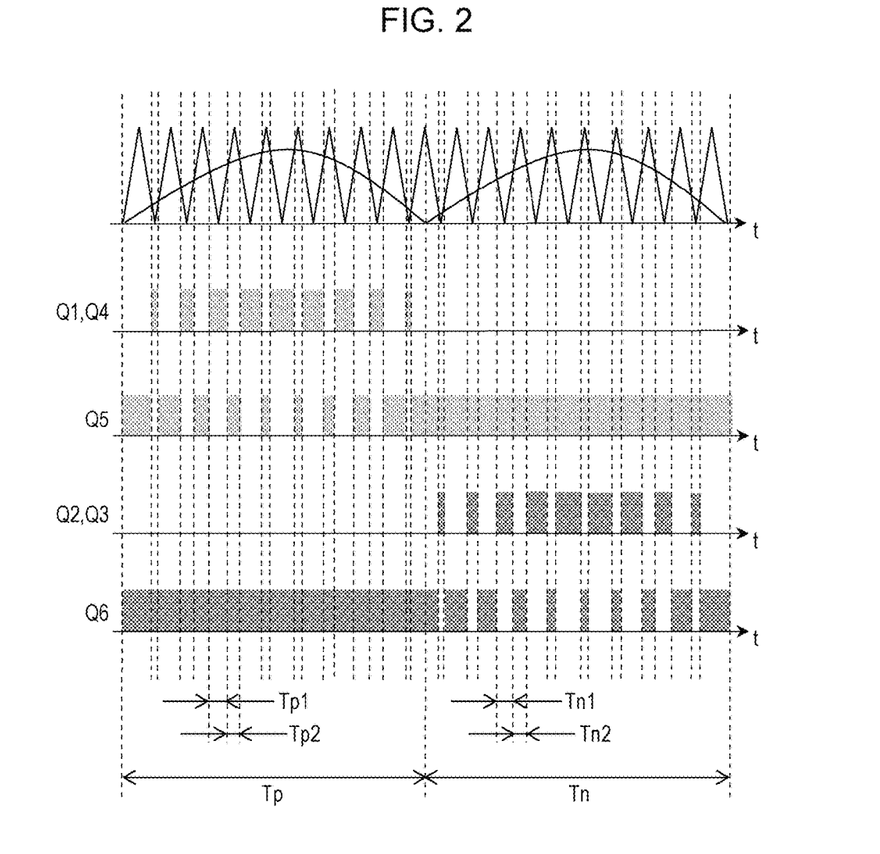
FIG. 2 is a timing chart illustrating a switching operation in this embodiment.

FIG. 2 is a timing chart illustrating a switching operation in this embodiment.

A period Tp1 is a period for which the first and fourth switching elements Q1 and Q4 are ON and the fifth switching element Q5 is OFF.

A period Tp2 is a period for which the first and fourth switching elements Q1 and Q4 are OFF and the fifth switching element Q5 is ON.

A period Tn1 is a period for which the second and third switching elements Q2 and Q3 are ON and the sixth switching element Q6 is OFF.

A period Tn2 is a period for which the second and third switching elements Q2 and Q3 are OFF and the sixth switching element Q6 is ON.

The controller 6 performs control so that, during a certain period Tp, the second and third switching elements Q2 and Q3 will be OFF and the sixth switching element Q6 will be ON. During this period Tp, the controller 6 alternately repeats the periods Tp1 and Tp2 while modulating the length of the period Tp1.

The controller 6 also performs control so that, during another certain period Tn, the first and fourth switching elements Q1 and Q4 will be OFF and the fifth switching element Q5 will be ON. During this period Tn, the controller 6 alternately repeats the periods Tn1 and Tn2 while modulating the length of the period Tn1.

According to the above-described switching operation, a DC voltage, which is the input voltage, is converted into an AC voltage, which is the output voltage.

As described above, in the power converter 1000, the switching elements to be ON are changed according to the polarity of the output AC voltage.

When the output voltage is at a positive polarity, the first and fourth switching elements Q1 and Q4 and the fifth switching element Q5 are complementarily switched with the provision of a dead time. During this time period, the second and third switching elements Q2 and Q3 are maintained in the OFF state, while the sixth switching element Q6 is maintained in the ON state.

When the output voltage is at a negative polarity, the second and third switching elements Q2 and Q3 and the sixth switching element Q6 are complementarily switched with the provision of a dead time. During this time period, the first and fourth switching elements Q1 and Q4 are maintained in the OFF state, while the fifth switching element Q5 is maintained in the ON state.

The controller 6 may create control pulses on the basis of a triangle-wave-and-sine-wave control technique, as shown in FIG. 2.

According to the above-described pulse width modulation (PWM) control, the controller 6 changes (switches) the ON/OFF states of the first through fourth switching elements Q1 through Q4 of the inverter 2 and the fifth and sixth switching elements Q5 and Q6 of the clamper 5.

With this switching operation, the controller 6 is able to apply a current or a voltage which approximates to an AC waveform to, for example, the load 4.

PWM control performed by the controller 6 may be implemented by software control or by an analog circuit using a comparator. The controller 6 may be constituted by, for example, a processor (such as a central processing unit (CPU) or a micro-processing unit (MPU)) and a memory. In this case, the processor may perform a control method disclosed in an embodiment of the present disclosure by reading and executing a program stored in the memory.

Figure 3:
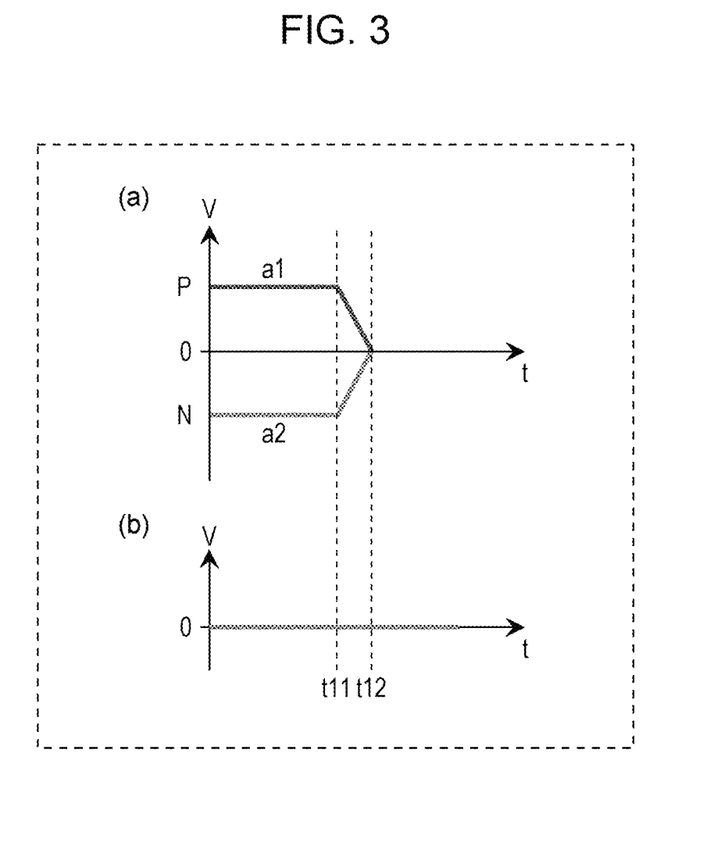
FIG. 3 illustrates a state in which a common-mode voltage is generated.

FIG. 3 illustrates a state in which a common-mode voltage is generated.

The state shown in FIG. 3 is a state where there is no variation in the characteristics of switching elements (that is, the state under ideal conditions).

FIG. 3(a) illustrates a voltage state at the first node 1a and that at the second node a2 when the first and fourth switching elements Q1 and Q4 are being turned OFF.

FIG. 3(b) illustrates the voltage state of common-mode noise corresponding to the voltage states shown in FIG. 3(a).

Immediately before the state in which the first and fourth switching elements Q1 and Q4 are turned OFF (that is, the first and fourth switching elements Q1 and Q4 are ON), a current flows in a path constituted by the positive electrode of the DC voltage source 3, the first switching element Q1, a first reactor L1, the load 4, a second reactor L2, the fourth switching element Q4, and the negative electrode of the DC voltage source 3 in this order.

At a time t11 shown in FIG. 3, the transition of the U phase and the W phase starts, that is, the first and fourth switching elements Q1 and Q4 start being turned OFF. Then, the first and second reactors L1 and L2 serve as current supply sources, and parasitic capacitance in the first through fourth switching elements Q1 through Q4 is charged and discharged. As a result, the voltage at the first node a1 drops and the voltage at the second node a2 rises.

At a time t12 shown in FIG. 3, the first node a1 and the second node a2 are at the same potential. Then, the fifth diode D5 conducts. As a result, the current in the first and second reactors L1 and L2 flows in a path constituted by the first reactor L1, the load 4, the second reactor L2, the sixth switching element Q6, and the fifth diode D5 in this order.

After the lapse of a dead time after the first and fourth switching elements Q1 and Q4 have started being turned OFF, the fifth switching element Q5 is turned ON. Then, the current in the first and second reactors L1 and L2 flows in a path constituted by the first reactor L1, the load 4, the second reactor L2, the sixth switching element Q6, and the fifth switching element Q5 in this order. Then, the switching operation has been completed.

In this manner, as shown in FIG. 3, the instant that the first and second nodes a1 and a2 are at the same potential, the clamper 5 (fifth switching element Q5) is turned ON. Accordingly, the common-mode voltage does not fluctuate. That is, if the operation is performed under the ideal conditions, the common-mode voltage at the timing at which the first and second nodes a1 and a2 are at the same potential is 0.

Figure 4:
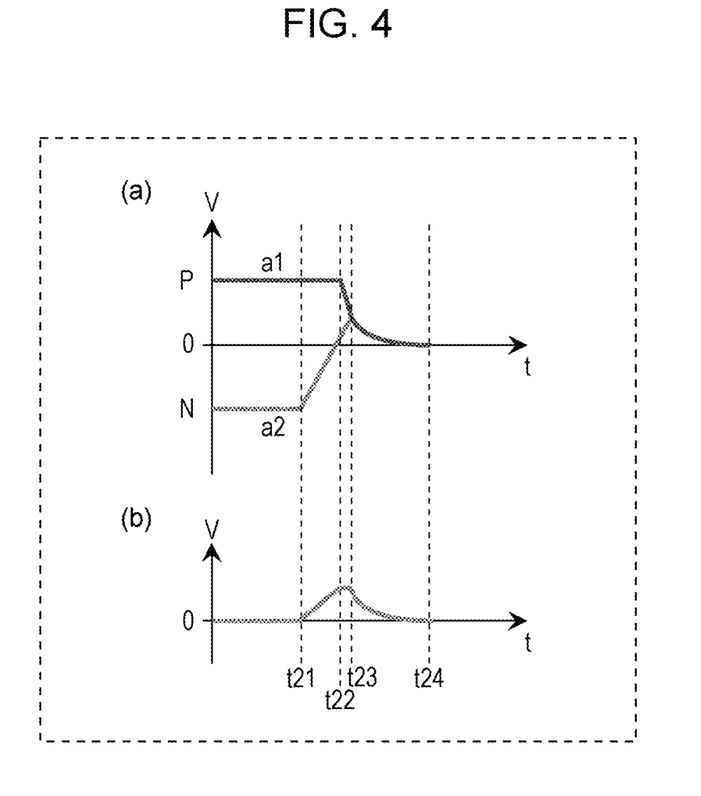
FIG. 4 illustrates a state in which a common-mode voltage is generated.

FIG. 4 illustrates a state in which a common-mode voltage is generated.

The state shown in FIG. 4 is a state where there is a variation in the characteristics of switching elements (that is, the conditions are not ideal).

FIG. 4(a) illustrates a voltage state at the first node 1a and that at the second node a2 when the first and fourth switching elements Q1 and Q4 are being turned OFF.

FIG. 4(b) illustrates the voltage state of common-mode noise corresponding to the voltage states shown in FIG. 4(a).

At a time t21 shown in FIG. 4, the transition of the W phase starts.

At a time t22 shown in FIG. 4, the transition of the U phase starts.

That is, since there is a variation in the characteristics of switching elements, there is a predetermined time difference in the transition timing between the U phase and the W phase.

At a time t23 shown in FIG. 4, the clamper 5 is turned ON with a common-mode voltage.

From a time t23 to a time t24, the voltage gradually attenuates because of the parasitic capacitance.

With the above-described switching operation, a common-mode voltage is generated, as shown in FIG. 4(b).

In this manner, due to a variation in the characteristics of switching elements, a common-mode voltage is generated.

The power converter 1000 is effective only for suppressing single-polarity common-mode noise.

For example, if the common-mode voltage at the load 4 is higher than that at the DC voltage source 3, the seventh through tenth diodes D7 through D10 are changed to the conducting state, and the capacitors C1 through C4 serve to suppress noise.

If the common-mode voltage at the load 4 is lower than that at the DC voltage source 3, a reverse voltage is applied to the seventh through tenth diodes D7 through D10, which makes it difficult for a current to flow.

For example, if the output voltage is at a positive polarity, the first and fourth switching elements Q1 and Q4 are switched ON.

The capacitor C1 including parasitic capacitance connected in parallel with the first switching element Q1 is charged, while the capacitor C2 including parasitic capacitance connected in parallel with the second switching element Q2 is discharged. As a result, the first switching element Q1 has been turned OFF.

In this case, a reverse voltage is being applied to the seventh and eighth diodes D7 and D8. Accordingly, the charging and discharging of the first and second capacitors C1 and C2 does not contribute to the switching operation.

Accordingly, the switching speed is not influenced by the first and second capacitors C1 and C2, that is, the switching speed is not decreased.

As described above, the power converter 1000 is effective for suppressing the occurrence of common-mode noise caused by a variation in the characteristics of components. That is, it is possible to suppress noise without delaying the switching time. Thus, conduction noise can be reduced without increasing switching loss or impairing the controllability.

In the above-described embodiment, as the switching elements, transistors, for example, insulated gate bipolar transistors (IGBTs), may be used.

The power converter 1000 may include the first reactor L1 and the second reactor L2.

In this case, as shown in FIG. 1, the first reactor L1 may be disposed between the fifth node a5 and the output side (load 4).

As shown in FIG. 1, the second reactor L2 may be disposed between the sixth node a6 and the output side (load 4).

By the provision of the first and second reactors L1 and L2, the current is less likely to change.

The controller 6 may change a state of the fourth switching element Q4 from an ON state to an OFF state, at a timing which shifted by a predetermined time from a timing at which the first switching element Q1 is changed from an ON state to an OFF state.

The controller 6 may also change a state of the third switching element Q3 from an ON state to an OFF state, at a timing which shifted by a predetermined time from a timing at which the second switching element Q2 is changed from an ON state to an OFF state.

With the above-described configuration, a variation in the timing at which the switching elements are turned OFF can be controlled. It is thus possible to control the polarity of common-mode noise.

The controller 6 may include a drive signal generator and a signal delayer.

The drive signal generator generates first through fourth drive signals for controlling the ON/OFF states of the first through fourth switching elements Q1 through Q4, respectively.

The signal delayer delays at least one of the first through fourth drive signals so as to generate a lag of the above-described predetermined time.

As described above, it is possible to control a variation in the timing at which the switching elements are turned OFF with a simple configuration.

Figure 5:
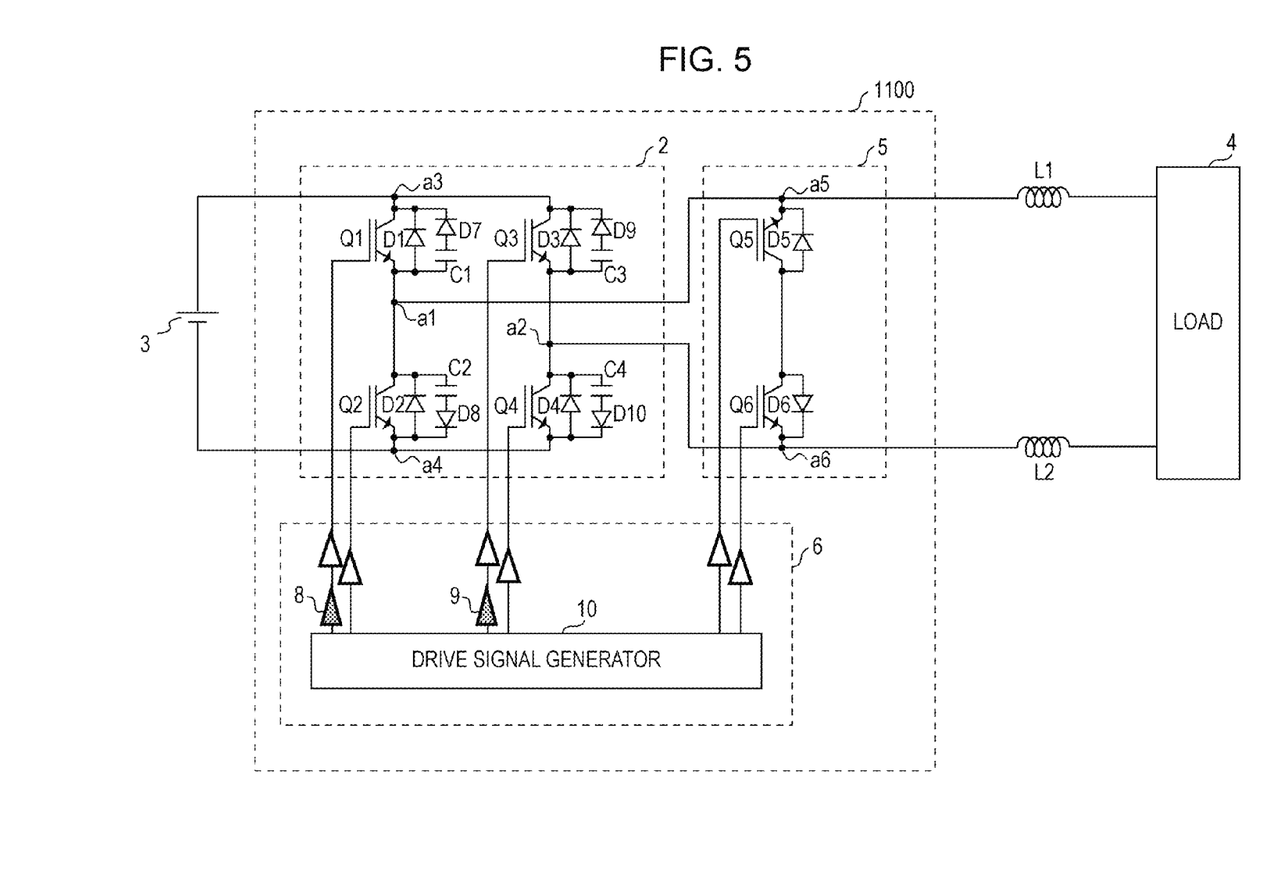
FIG. 5 is a circuit diagram of the schematic configuration of a power converter, which is a modified example of this embodiment.

FIG. 5 is a circuit diagram of the schematic configuration of a power converter 1100, which is a modified example of the above-described embodiment.

In the power converter 1100, the controller 6 includes a drive signal generator 10 and first and second signal delayers 8 and 9.

The drive signal generator 10 generates first through sixth drive signals for controlling the ON/OFF states of the first through sixth switching elements Q1 through Q6, respectively.

The first and second signal delayers 8 and 9 add a predetermined delay time to the signals output from the drive signal generator 10.

The first and second signal delayers 8 and 9 may be implemented by software control or by an analog circuit.

With the above-described configuration, the waveform shape of a common-mode voltage which is determined by the characteristics of components can be controlled in accordance with the delay time added by the first and second signal delayers 8 and 9.

That is, it is possible to control the polarity of common-mode noise produced during the switching operation by using the first and second signal delayers 8 and 9.

For example, the first signal delayer 8 may delay the timing at which the first switching element Q1 is turned OFF to be later than that at which the fourth switching element Q4 is turned OFF. In this case, only a positive common-mode voltage is generated.

Conversely, the first signal delayer 8 may hasten the timing at which the first switching element Q1 is turned OFF to be earlier than that at which the fourth switching element Q4 is turned OFF. In this case, only a negative common-mode voltage is generated.

The operation of the second signal delayer 9 is similar to that of the first signal delayer 8, and a detailed explanation thereof will thus be omitted.

With the above-described configuration, it is possible to control a variation in the timing at which switching elements are turned OFF. This makes it possible to fix the polarity of a common-mode voltage at a desired polarity. For example, the controller 6 may perform control so that the common-mode voltage at the load 4 will be higher than that at the DC voltage source 3. Then, the seventh through tenth diodes D7 through D10 are changed to the conducting state, and the capacitors C1 through C4 serve to suppress noise.

As shown in FIG. 5, the controller 6 may include an amplifier circuit for amplifying a control signal (drive signal) output from the drive signal generator 10 to a predetermined voltage.

In the above-described embodiment of the present invention, the "connection between two elements" (e.g., one element connects to another element) may mean, not only a direct connection, but also an electrical connection and a connection in which an element (e.g., a wiring, a resistor, and the like, which do not impair the functions of the embodiments) is inserted therebetween.

The power converter according to an embodiment of the present disclosure may be used in, for example, a power conditioner and a rotor driving inverter.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A power converter comprising:
   first through sixth switching elements;
   first through tenth diodes;
   first through fourth capacitors; and
   a controller, wherein
   a second end of the first switching element and a first end of the second switching element are connected to each other at a first node,
   a second end of the third switching element and a first end of the fourth switching element are connected to each other at a second node,
   a first end of the first switching element and a first end of the third switching element are connected to each other at a third node,
   a second end of the second switching element and a second end of the fourth switching element are connected to each other at a fourth node,
   a second end of the fifth switching element and the first node are connected to each other at a fifth node,
   a second end of the sixth switching element and the second node are connected to each other at a sixth node,
   a first end of the fifth switching element and a first end of the sixth switching element are connected to each other,
   an input voltage is input between the third node and the fourth node,
   the controller controls ON/OFF states of the first through sixth switching elements to convert the input voltage into an output voltage,
   the output voltage is output from between the fifth node and the sixth node, the first through fourth diodes are connected inversely in parallel with the first through fourth switching elements, respectively,
   the fifth diode is connected in parallel with the fifth switching element,
   the sixth diode is connected in parallel with the sixth switching element,
   the first through fourth capacitors are connected in parallel with the first through fourth switching elements, respectively,
   the seventh diode is connected in series with the first capacitor and is connected inversely in parallel with the first switching element,
   the eighth diode is connected in series with the second capacitor and is connected in parallel with the second switching element,
   the ninth diode is connected in series with the third capacitor and is connected inversely in parallel with the third switching element, and
   the tenth diode is connected in series with the fourth capacitor and is connected in parallel with the fourth switching element.

2. The power converter according to claim 1, wherein
   the controller changes a state of the fourth switching element from an ON state to an OFF state, at a timing which shifted by a predetermined time from a timing at which the first switching element is changed from an ON state to an OFF state, or the controller changes a state of the third switching element from an ON state to an OFF state, at a timing which shifted by a predetermined time from a timing at which the second switching element is changed from an ON state to an OFF state.

3. The power converter according to claim 2, wherein:

the controller includes a drive signal generator and a signal delayer;

the drive signal generator generates first through fourth drive signals for controlling the ON/OFF states of the first through fourth switching elements, respectively; and the signal delayer generates a lag of the predetermined time by delaying at least one of the first through fourth drive signals.

4. The power converter according to claim 1, wherein a period Tp1 is a period for which the first and fourth switching elements are ON and the fifth switching element is OFF, a period Tp2 is a period for which the first and fourth switching elements are OFF and the fifth switching element is ON, a period Tn1 is a period for which the second and third switching elements are ON and the sixth switching element is OFF, a period Tn2 is a period for which the second and third switching elements are OFF and the sixth switching element is ON, during a period for which the second and third switching elements are OFF and the sixth switching element is ON, the controller alternately repeats the period Tp1 and the period Tp2 and modulates a length of the period Tp1, and during a period for which the first and fourth switching elements are OFF and the fifth switching element is ON, the controller alternately repeats the period Tn1 and the period Tn2 and modulates a length of the period Tn1.

* * * * *